Patented Apr. 15, 1924.

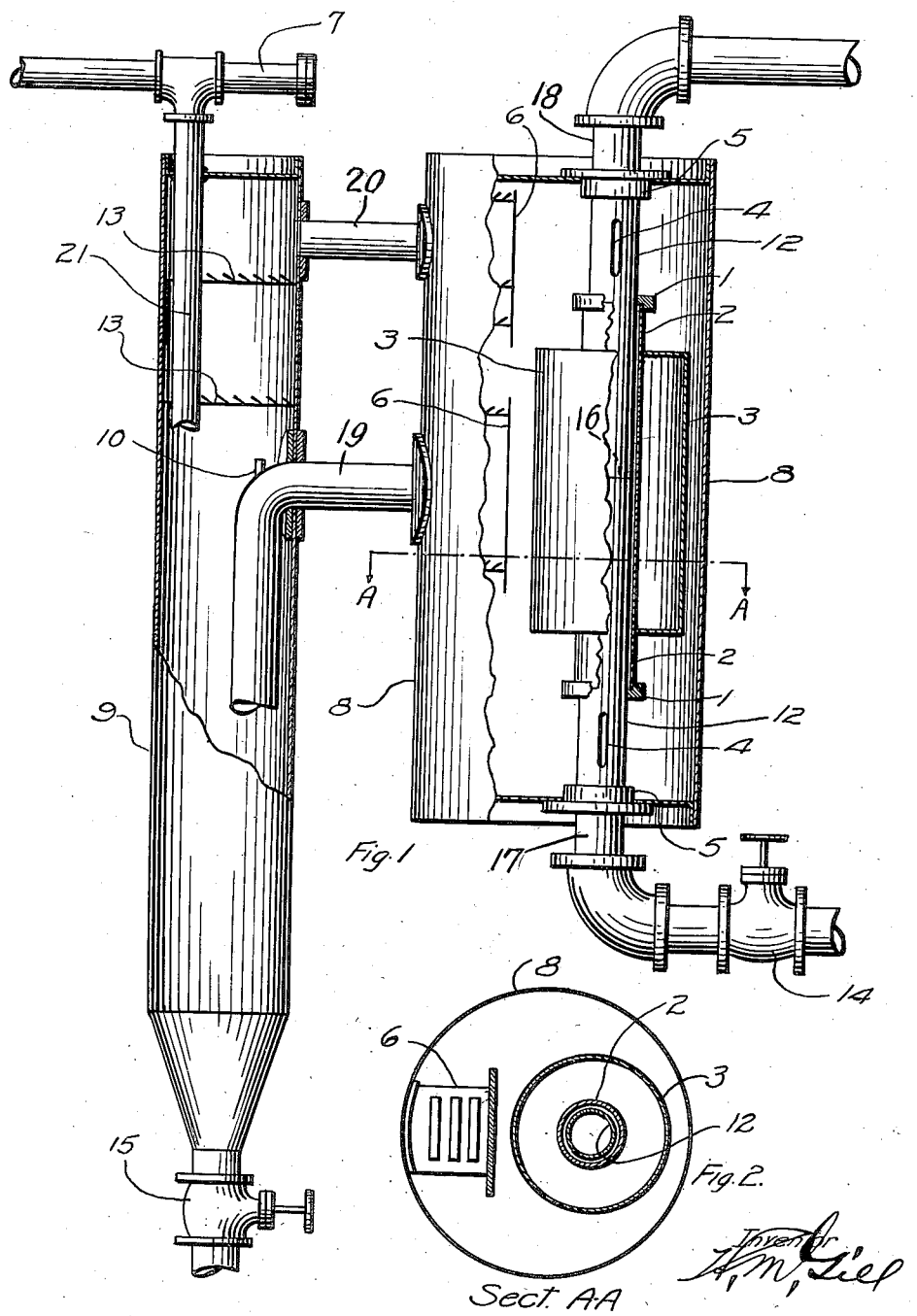

1,490,462

UNITED STATES PATENT OFFICE.

HARRISON M. GILL, OF TAFT, CALIFORNIA.

GAS, OIL, AND SAND SEPARATOR.

Application filed October 2, 1923. Serial No. 666,189.

*To all whom it may concern:*

Be it known that I, HARRISON M. GILL, a citizen of the United States, residing at Taft, in the county of Kern and State of California, have invented certain new and useful Improvements in Gas, Oil, and Sand Separators, of which the following is a specification.

My invention relates to an apparatus for separating gas, sand and water from oil as it comes from a producing oil well.

The principal objects of my invention are, first, to provide in such an apparatus, a simple and effective float valve, without levers, fulcrums and other complicated working parts, for automatically controlling the separate discharge of gas and oil; second, to provide an initial separating effect in which the sand and water are separated from the gas and oil before the latter are conducted to the float valve chamber, so that said valve is not subjected to the abrasive action of the sand; third, to provide means, in said initial separating effect, for separating the gas from the oil, so that said gas and oil may be separately conducted to the valve chamber; fourth, to provide an oil seal, to permit a vacuum to be applied in the gas or oil discharge lines, without affecting the separating process; and fifth, to carry out the entire separating process in closed vessels, to prevent waste by evaporation.

To these ends my invention consists in the novel gas, oil, and sand separator which I shall now fully describe with reference to the accompanying drawing, wherein—

Fig. 1 is a part sectional elevation of my separator.

Fig. 2 is a horizontal section through the valve chamber and float, taken on the line A—A of Fig. 1.

In the drawings, the reference numeral 7 designates the pipe line leading from the well. The mixed oil, gas, sand, and water, coming from the well through said pipe 7, is discharged into an initial separating chamber 9 through a downwardly extending branch or inlet pipe 21. The initial separating chamber 9 is elongated and vertically disposed, and the inlet pipe 21 enters at its upper end and extends downwardly for a short distance as shown. The sand and water settle to the bottom of the chamber 9, and may be drawn off, at suitable intervals, through a controllable discharge connection 15. The gas rises to the upper portion of said chamber 9, passing through baffle plates 13 which assist in drying the gas and prevent splash or spray from the oil from rising into said upper portion of the chamber 9.

The oil occupies the chamber 9 up to the level of a discharge or transfer pipe 19, through which it flows out. Said transfer pipe 19 has its entrance protected by some suitable shield or baffle to prevent the entrance of gas from above the oil level, such shield being shown in the drawings as formed by a downwardly turned end portion of said pipe 19, the entrance thereof lying below the level of the horizontal portion of said pipe and therefore below the surface of the oil in the chamber 9. If desired, a restricted vent, indicated at 10, may be provided in the pipe 19 to permit the escape of any small amount of gas which may become trapped in said pipe.

The oil transfer pipe 19 leads into the approximate central region of a float valve chamber 8, preferably positioned in proximity to the separating chamber 9, as shown. A second transfer pipe 20 connects the respective upper portions of the chambers 9 and 8, said pipe 20 conducting the separated gas from the upper portion of the chamber 9 to the upper portion of the chamber 8. Baffles 6 are preferably positioned within the float chamber 8, in front of the outlets of the transfer pipes 19 and 20, as shown, the lower baffle deflecting the oil issuing from the pipe 19 to prevent it from impinging directly upon the float, and the upper baffle serving to further dry the gas issuing from the pipe 20, by causing condensation of the heavier vapors and liquid carried in suspension.

The float chamber 8 is provided with a vertical pipe or tube 12, passing through suitable flanges 5 in the heads of said chamber, and communicating, at its upper and lower ends respectively, with a gas discharge line 18 and an oil discharge line 17, the latter being provided, if desired, with a controlling valve 14. The pipe 12 is provided with a plug or partition, indicated at 16, which divides its interior into separate upper and lower portions. Said pipe is also provided with elongated ports 4, in both its upper and lower end portions, for the respective discharge of the gas and oil from the chamber 8.

A sleeve 2 freely surrounds the pipe 12, and has collars 1 at its ends, said collars being a close sliding fit upon said pipe. A float 3 is secured upon the sleeve 2, and floats upon the oil in the chamber 8, following the level of said oil and moving the sleeve 2 up or down. Therefore, if an excess of oil comes into the chamber 8, the float 3 rises, and the upper collar 1 restricts or closes the upper or gas discharge ports 4 until the increasing volume and pressure of gas within the chamber 8 forces the excess oil out through the lower or oil discharge ports 4, thereby lowering the oil level in the chamber and permitting the float 3 to descend. On the other hand, if an excess of gas, in proportion to oil, comes into the chamber 8, the oil level therein drops, causing the float to descend until its lower collar 1 restricts or closes the oil discharge ports 4, thereby permitting the oil level to again build up.

Thus it will be seen that, no matter what may be the proportions of oil and gas fed into the apparatus, provided, of course, that the total volume is within the capacity of the various ports and pipes, the separation is complete and positive, and there is no possibility of gas finding its way into the oil discharge line, or vice versa. Moreover, the operation of the apparatus is independent of the pressure of the incoming fluids, and, because there is always a quantity of oil trapped in the lower portion of the float chamber to act as a seal, a vacuum may be applied in the discharge lines without any adverse effect.

The initial separation of the sand in the separating chamber 9 relieves the valve mechanism in the float chamber 8 from any abrasive effect due to the passage of sand in suspension in the oil. This separation of the sand within the closed chamber 9 also eliminates the necessity for employing settling troughs or tanks.

I claim:

1. A gas and oil separator comprising a closed vessel; a pipe within said vessel having ports in its upper and lower portions, and a partition dividing its interior between said ports; gas and oil discharge connections respectively from the upper and lower portions of said pipe; and a float operated valve for reciprocally controlling said ports according to the proportions of gas and oil within said vessel.

2. A gas and oil separator comprising a closed vessel; a pipe therein having an upper port and a lower port communicating with the upper and lower areas respectively of said vessel, said pipe between said ports being interiorly divided; delivery pipes connected with the respective ends of said ported pipe; a sleeve valve slidably fitted upon said ported pipe and adapted to reciprocally control its ports; and a float carried by and adapted to operate said sleeve valve.

3. A gas and oil separator comprising a closed vessel; a pipe therein having an upper elongated port and a lower elongated port communicating with the upper and lower areas respectively of said vessel, said pipe between said ports being interiorly divided; a delivery pipe from each end of said ported pipe; a sleeve valve slidably fitted upon said ported pipe and adapted to reciprocally proportionally control the elongated ports thereof; and a float carried by and adapted to operate said sleeve valve.

4. A gas and oil separator comprising a closed vessel; means for delivering the gas and the oil respectively to the upper and lower areas of said vessel; baffle members within said vessel opposite the entrances of said gas and oil; a pipe within said vessel having an upper port and a lower port communicating with the upper and lower areas respectively of said vessel said pipe between said ports being interiorly divided; a delivery pipe from each end of said ported pipe; a sleeve valve slidably fitted upon said ported pipe and adapted to reciprocally proportionally control the elongated ports thereof; and a float carried by and adapted to operate said sleeve valve.

5. A gas and oil separator comprising a closed vessel; means for delivering the gas and the oil respectively to the upper and lower areas of said vessel; baffle members within said vessel opposite the entrances of said gas and oil; a pipe within said vessel having an upper elongated port and a lower elongated port communicating with the upper and lower areas respectively of said vessel, said pipe between said ports being interiorly divided; a delivery pipe from each end of said ported pipe; a sleeve valve slidably fitted upon said ported pipe and adapted to reciprocally proportionally control the elongated ports thereof; and a float carried by and adapted to operate said sleeve valve.

6. A gas and oil separator comprising an initial closed vessel for receiving the mixture of gas, oil, sand and water as it comes from a well and settling out therefrom the sand and water; a second closed vessel to the upper and lower areas of which the gas and oil from the initial vessel are respectively separately delivered; and means within said second vessel for automatically, reciprocally controlling the separate discharge of the gas and oil therefrom according to the proportions of gas and oil entering said vessel.

7. A gas and oil separator comprising a closed vessel having an inlet for the mixture of gas, oil, sand and water as it comes from a well, an outlet in its bottom for the sand and water, an outlet from its upper area for the gas, and an outlet from its lower area for the oil; a second closed vessel; pipes connecting the upper and lower areas of said second vessel respectively with said gas and oil outlets of the first vessel; separate discharge connections for the gas and oil from said second vessel; and float-operated means within said vessel for reciprocally controlling said discharge connections according to the proportions of gas and oil entering said second vessel.

8. A gas and oil separator comprising an initial closed vessel for receiving the mixture of gas, oil, sand and water as it comes from a well and settling out therefrom the sand and water; a second closed vessel to the upper and lower areas of which the gas and oil from the initial vessel are respectively separately delivered; a pipe within said second vessel having ports in its upper and lower portions, and a partition dividing its interior between said ports; gas and oil discharge connections respectively from the upper and lower portions of said pipe; and a float operated valve for reciprocally controlling the ports of said pipe according to the proportions of gas and oil within said second vessel.

HARRISON M. GILL.